US006334048B1

(12) United States Patent
Edvardsson et al.

(10) Patent No.: US 6,334,048 B1
(45) Date of Patent: Dec. 25, 2001

(54) ANTENNA SYSTEM AND A RADIO COMMUNICATION DEVICE INCLUDING AN ANTENNA SYSTEM

(75) Inventors: Olov Edvardsson, Täby; Richard Bohannan, Långås; Per Norén, Västra Frölunda, all of (SE); Gianni Barone, Rome (IT)

(73) Assignee: Allgon AB, Akersbergs (SE)

( * ) Notice: Subject to any disclaimer, the term of this patent is extended or adjusted under 35 U.S.C. 154(b) by 0 days.

(21) Appl. No.: 09/313,650

(22) Filed: May 18, 1999

(30) Foreign Application Priority Data

May 18, 1998 (SE) .................................................. 9801754

(51) Int. Cl.[7] ...................................................... H04B 1/38

(52) U.S. Cl. ............................ 455/90; 455/575; 343/702; 343/853; 343/895

(58) Field of Search ............................. 455/90, 552, 553, 455/575, 73, 12.1, 427; 343/850, 853, 895, 702, 725

(56) References Cited

U.S. PATENT DOCUMENTS

| | | | |
|---|---|---|---|
| 4,011,567 | 3/1977 | Ben-Dov | 343/853 |
| 5,600,341 | 2/1997 | Thill et al. | 343/895 |
| 5,628,057 | 5/1997 | Phillips et al. | 455/89 |
| 5,721,557 * | 2/1998 | Wheeler et al. | 343/895 |
| 5,986,619 * | 11/1999 | Grybos et al. | 343/895 |

FOREIGN PATENT DOCUMENTS

| | | |
|---|---|---|
| 0791978 | 8/1997 | (EP) . |
| WO96/06468 | 2/1996 | (WO) . |
| WO97/37401 | 10/1997 | (WO) . |

OTHER PUBLICATIONS

Patent Abstracts of Japan, Abstract of JP 9–219621 A, (Kyocera Corp), Aug. 19, 1997.

Patent Abstracts of Japan, Abstract of JP 8–298410 A, (Kyocera Corp), Nov. 12, 1996.

* cited by examiner

*Primary Examiner*—Nay Maung
*Assistant Examiner*—Quochien B. Vuong
(74) *Attorney, Agent, or Firm*—Jacobson Holman, PLLC

(57) ABSTRACT

An antenna system including an antenna device and feed device for transmitting and receiving circularly polarized RF waves in a first mode of operation, and of linearly polarized RF waves in a second mode of operation, and a hand-held mobile communication device provided with such an antenna system. A radiating structure (10) including N helical radiating elements (12A–D), being coextending and coaxially arranged on a support structure (11) are fed in order to provide for transmission/reception of circularly polarized RF waves in the first mode of operation. N is an integer greater than one. Further, means (24A–D, 16, 17, 19, 25, 25A) are arranged for essentially uniform excitation of the helical radiating elements (12A–D) in order to provide for transmission/reception of linearly polarized RF waves in the second mode of operation.

21 Claims, 3 Drawing Sheets

ANTENNA SYSTEM AND A RADIO COMMUNICATION DEVICE INCLUDING AN ANTENNA SYSTEM

FIELD AND BACKGROUND OF THE INVENTION

The invention relates to a system including an antenna device and feed device for transmitting and receiving RF waves. Specifically, it relates to a system for a mobile radio communication device, e.g., a hand-portable telephone, which is capable of both transmitting and receiving on multiple separate frequency bands.

In the communication services today it is an increasing demand for availability and small sizes of the user units. A user of a hand-portable communication unit wishes to be reached wherever his location may be. This puts requirements on the operators to provide for good coverage of their mobile networks. For areas with few users, e.g. in low-populated areas, at the countryside, or at sea, it is uneconomical or impossible to provide for good coverage by means of terrestrial mobile phone systems. For such areas, good coverage can be obtained by means of communication via satellites. Since communication with linearly polarized RF waves, which are used in the terrestrial mobile communication systems, requires a certain degree of alignment between the transmitting and receiving antennas, this type of signals are unsuitable for satellite communication. Instead circularly polarized RF waves are used. This means that a special type of antenna has to be used. It is practical when the same mobile telephone can be used for both satellite communication and terrestrial communication. To obtain this, telephones have been provided with two antennas.

This does not comply with the demands on antennas for hand-portable telephones, to be compact, and to occupy a small space.

RELATED ART

U.S. Pat. No. 5,628,057 discloses a radiotelephone transmitter having an antenna for satellite communication. The antenna is attached to the telephone at a pivot point. This antenna only operates in a circular polarization mode, and is not provided with means for operation in a linear polarization mode.

Each of WO 96/06468, WO 97/37401 and EP 0 791 978 discloses an antenna for receiving circularly polarized RF waves in a satellite positioning system (GPS). Each of the antennas includes a ceramic core having four helical radiating elements. A feeder line passes through the core from the bottom of the antenna, and is connected to the radiating elements at the top of the antenna. The self phasing structure of the antenna and the feeding thereof makes the antenna operable in a very narrow frequency band, viz. a relative bandwidth of a few tenths of a percent. This is sufficient since the antenna is designed for receiving GPS signals. It is not suitable for two way radio communication, where a relative bandwidth of a few or up to ten percent is required.

Further, U.S. Pat. No. 5,600,341 discloses an antenna operating with circular polarization and linear polarization. A QHA (quadrifilar helical antenna) for circular polarization is stacked on a linear antenna fed by a two wire helix. The linear antenna operates with linear polarization and a part of the antenna function is performed by the two wire helix, although some coupling to the feed line will occur. This document does not teach how the quadrifilar helical antenna should operate with linear polarization. No phasing network is described, and the helix is therefore supposed to be self-phased although this is not mentioned. A self-phased helix is an antenna operating in a very narrow frequency-band, and usually limited to GPS service where <0.2% bandwidth is required. For most satellite telephone bands a self-phased QHA has a quite insufficient bandwidth. Due to the stacking of the antennas for circular polarization and for linear polarization, the disclosed antenna means is space demanding, and uses the antenna volume in an inefficient way.

JP-A-09219621 discloses an antenna for linear polarization stacked on a helical antenna for circular polarization. Since a helical antenna having less then three helices normally need to have a circumference of $\lambda$ to give circular polarization, this antenna must be very space demanding or work in some other way which is not explained. No phasing network is present, and is not needed if the helices are self-phased, but then a very narrow frequency band is achieved.

JP-A-08298410 discloses an antenna including two helices, one inside the other. The inner helix is extendable, and when extended it acts as an antenna for circular polarization. Since only one helical element is present the circumference has to be $\lambda$ in order to give circular polarization, why also this antenna must be very space demanding. In the retracted state of the inner helix the antenna acts as an antenna for linear polarization. No phasing network is needed since only one helical element is employed for achieving the circular polarization.

RELATED PATENT APPLICATIONS

The following patent applications are related to the same technical field as the invention of this application, and are hereby incorporated herein by reference:

- the Swedish patent application SE 9801755-1 having the title "Antenna device comprising capacitively coupled radiating elements and a hand held radio communication device for such antenna device", filed in Sweden the same day as this application, May 18, 1998, applicant Allgon A B,
- the Swedish patent application SE 9801753-6 having the title "Antenna device comprising feeding means and a hand held radio communication device for such antenna device", filed in Sweden the same day as this application, May 18, 1998, applicant Allgon A B, and
- the Swedish patent application SE 9704938-1, filed Dec. 30, 1997, applicant Allgon A B, having the title "Antenna system for circularly polarized radio waves including antenna means and interface network".

SUMMARY OF THE INVENTION

A main object of the invention is to provide an antenna system including an antenna device and feed device for transmission/reception of circularly polarized RF waves in a first mode of operation and for transmission/reception of linearly polarized RF waves in a second mode of operation.

It is also an object of the invention to provide an antenna system which can be used for satellite communication and terrestrial mobile communication, and occupies a small space.

It is also an object of the invention to provide an antenna system providing good isolation between the radiating structure for circularly polarized waves and the means for excitation of said radiating structure for operation with linearly polarized waves, in order to avoid that the high transmission power for one polarization mode will damage the sensitive receiver of the other polarization mode.

Another object of the invention is to provide an antenna system which exhibits high efficiency in different frequency bands and modes of operation, and advantageous radiation lobe pattern.

It is a further object of the invention to provide an antenna system that exhibits broad band characteristics, necessary for radio telephone use within most systems.

These and other objects are attained by an antenna means according to the appended claims.

By the features of claim 1 it is achieved an antenna system having a good antenna function, since the current maximum in linear polarization mode can be located high above a telephone.

Through the arrangement of a central radiator in the radiating structure, it is achieved an efficient and uniform excitation of the helical radiating elements in order to provide for transmission/reception of linearly polarized RF waves in a second mode of operation.

Through the arrangement of the centrally arranged radiator protruding beyond the second end of the radiating structure for circularly polarized RF waves, it is achieved an improved antenna operation in the linear polarization mode.

DESCRIPTION OF PREFERRED EMBODIMENTS

Figure 1:
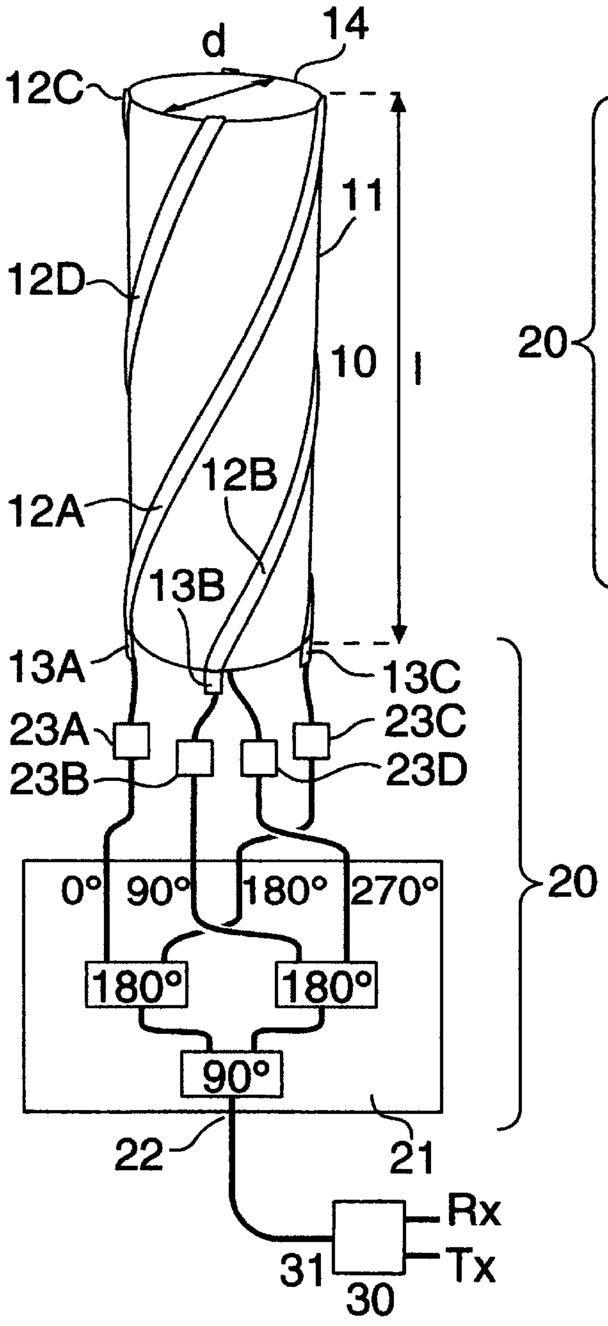
FIG. 1 is a diagrammatic view of an antenna system including an antenna device and feed device for transmitting and receiving RF waves in connection to a radio communication device, according to the invention.

With reference to FIG. 1, an antenna system including an antenna device and feed device for transmitting and receiving RF waves in connection to a radio communication device, according to the invention is diagrammatically shown. The system shown in FIG. 1 is designed for communication via satellite by means of circularly polarized RF waves. It includes a radiating structure 10, which comprises a support 11, which can be a flexible film, a flexible printed circuit board (PCB), or a solid tubular body. On the support 11, a number N of conductive helical radiating elements, are coextending and coaxially arranged. In the figure N=4, but it could be any number greater than 1. However, it is preferred that N is greater 2, in order to achieve isolation (discrimination) between right-hand and left-hand circular polarization. The smallest number for N in order to achieve this discrimination is 3, which gives the most space efficient solution. N=4 is mostly used, since it is suited for common types of components. The helical radiating elements are denoted 12A–D, and preferably have a width being several times their thickness, e.g. four times. The radiating elements may be formed by initially plating the surface of the support 11 with a metallic layer, and then selectively etching away the layer to expose the support according to a pattern applied in a photographic layer similar to that used for etching printed circuit boards. Alternatively the metallic material may be applied by selective deposition or by printing techniques. The radiating structure 10 can also be manufactured by the use of MID (molded interconnection device) technology, and it is possible to form the helical radiating elements in wire form.

The radiating structure 10 is shown to have a circular cross section, but it could be of other shapes, e.g. quadratic, and still be included in a coaxial configuration.

The so formed N-filar radiating structure 10 has a first end 15 and a second end 14. At the first end 15, the helical radiating elements 12A–D are provided with a respective feed point, or feed portion 13A–D.

A feeding means 20 is connected to the radiating structure 10, for feeding and reception of signals. The feeding means 20 possibly comprises a diplexer 30 having an input Tx for signals to be transmitted by the antenna system and comes from the transceiver circuits of the radio communication device, and an output Rx for signals received by the antenna system to be transmitted to the transceiver circuits of the radio communication device. When the antenna is retractable/extendable it is preferred that the diplexer 30, if needed, is included in the circuitry of the radio communication device. In that case the connection between the diplexer and the feeding means 20 preferably is a flexible coaxial cable. The output 31 of the diplexer 30 or the output of the transceiver circuits of the radio communication device is connected to a phasing network 21. The phasing network comprises a 90° power divider, which divides the signals on the input into two signals, one phase shifted 90° in relation to the other. Each of the outputs of the 90° power divider is connected to the input of a 180° power divider, dividing the signals on the input into two signals, one phase shifted 180° in relation to the other. Thus the feeding means 20 has four outputs, with signals phase shifted 0°, 90°, 180° and 270° respectively. Each of the outputs is connected, possibly via matching means 23A–D, with a respective feed portion 13A–D, so as to obtain a progressive phase shift on the feed portions 13A–D. The matching means are used for providing a predetermined impedance, preferably 50 ohm, of the antenna structure, towards the connected circuits. A signal put on the Tx input of the diplexer and so divided into phase shifted signals and fed to the radiating structure 10 will create a circularly polarized RF wave to be radiated by the radiating structure 10. In the general case with N helical radiating elements, there are N feed portions, matching means and outputs of the phasing network, which provides a progressive phase shift, where the exact choice of components is obvious to a person skilled in the art. Preferably, the progressive phase shift is 360°/N. However without full geometric symmetry of the helical radiating elements the phases are shifted accordingly. The phase shift between each pair of feed portions corresponds to the angle between them. When the angle between a line from the center axis of the radiating structure through a first feed portion and a line from the center axis of the radiating structure through a second feed portion is for example 45°, the phase shift between the feed portions is selected to be 45°.

Since the radiating structure 10 and the feeding means 20 are passive, they will operate reverse when receiving a circularly polarized RF wave polarized in the same direction.

It is preferable that the 180° power dividers consists of wide band baluns, i.e. giving good balance for all involved frequency bands, since signals having the same phase on the feed portions 13A–D, e.g. linearly polarized signals received by the radiating structure 10, then will cancel each other, and not enter the circuitry of the radio communication device. The 90° power divider preferably consists of a 90° hybrid.

The radiating structure 10 preferably has a diameter d in the range 10–14 mm, and a length 1 preferably in the range 80–120 mm, for operation in the frequency range 1.4–2.5 GHz.

The so described antenna device and feed device can be used for radio communication in systems using satellites, and also for receiving signals in positioning systems using satellites, e.g. GPS. The radio communication systems using satellites usually operate in relatively wide bands (e.g. at center frequencies between 1.4 and 2.5 GHz) and in some cases bands widely separated in uplink and downlink (e.g. 1.6 GHz and 2.5 GHz). Therefore broad band antenna systems must be used in such applications. Through the design of the radiating structure 10 and the feeding means 20 the antenna system described has broad band characteristics. Self phasing helical antennas customer used for GPS are generally too narrow in bandwidths for radio telephone purposes.

Figure 2:
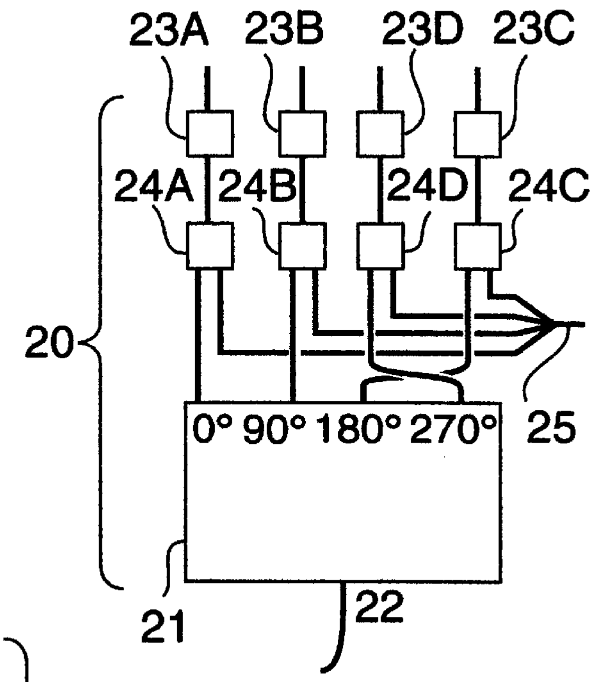
FIG. 2 is a diagrammatic view of the feeding means of the antenna system according to FIG. 1, when adapted for use in a first and second mode of operation, according to an embodiment of the invention.

FIG. 2 shows the feeding means 20 of the antenna system according to FIG. 1, when adapted for use in a first mode of operation, when transmitting/receiving circularly polarized RF waves, as described above, and for use in a second mode of operation when transmitting/receiving linearly polarized RF waves. The operation in the second mode is used for radio communication in a terrestrial communication system e.g. a GSM, PCN, DECT, AMPS, PCS, and/or JDC cellular telephone system.

To provide for operation in the second mode, a diplexer 24A–D is connected on one of its inputs to a respective output of the phasing network 21. The other input of each diplexer is connected to a common line 25 connected to the transceiver circuits of the radio communication device for communication with linearly polarized RF waves. When the antenna is retractable/extendable this line preferably is a flexible coaxial cable. The outer conductor should be connected to a ground structure or ground plane. The output of each diplexer is connected to the respective matching means 23A–D. Through this feeding the signals put on the feed portions 13A–D, entered through line 25, will have the same phase, and the radiating structure 10 will operate essentially as a straight radiator. Also here where the components are passive the operation when receiving a signal is reverse to that of transmitting a signal.

The feeding means 20 and possibly the diplexer(s) are preferably arranged on a PCB or other suitable means, and are constituted of discrete or distributed components.

Figure 3:
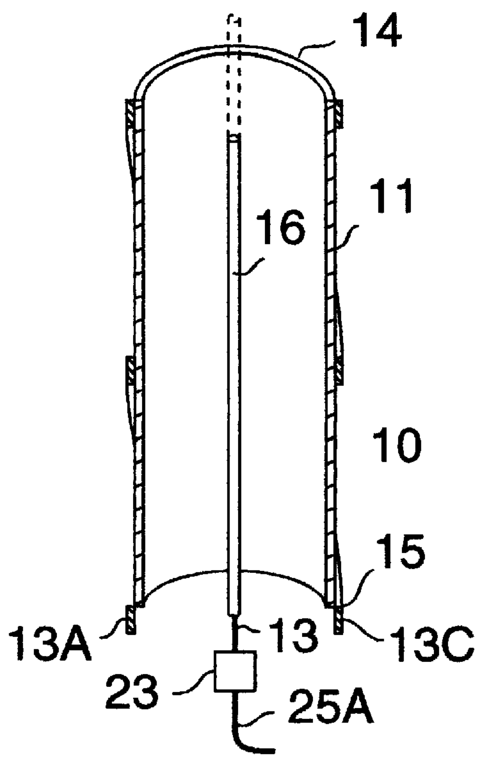
FIG. 3 is a diagrammatic view of an embodiment of a partly broken up radiating structure, and an arrangement for the excitation or feeding of the radiating structure for operation also with linearly polarized RF waves, according to the invention.

FIG. 3 shows the radiating structure 10 broken up, and an arrangement for the excitation or feeding of the helical radiating elements 12A–D for them to operate with linearly polarized RF waves. The radiating structure 10 is coupled to the feeding means 20 and the transceiver circuits of the radio communication device, and operates in the first mode, in the same or similar manner as described in connection with FIGS. 1 and 2. For the operation in the second mode, with linearly polarized RF waves, a straight radiator 16 is arranged coaxially with the radiating structure 10.

The straight radiator 16 is fed at its feed portion 13 at its first end, which preferably is located essentially in the plane of the first end 15 of the radiating structure 10. The feed portion 13 is connected with the line 25A, possibly via a matching means 23. The line 25A is connected with the transceiver circuits of the radio communication device. When the line is a flexible coaxial cable, as described above, the outer conductor is connected with a ground structure or ground plane. The second end of the straight radiator 16 is a free end.

The length of the straight radiator 16 can be smaller than the length of the radiating structure 10. Preferably the straight radiator 16 is about 10–20 mm longer than the radiating structure 10, as illustrated with the dotted lines in the figure.

When the straight radiator 16 is fed with a signal it couples to the radiating structure 10, which will be excited and radiate essentially as a straight radiator. When receiving an RF signal the operation is the reverse. In the case the straight radiator 16 extends beyond the second end of the radiating structure 10, the portion not surrounded by the radiating structure 10 will operate as a straight radiator.

Figure 4:
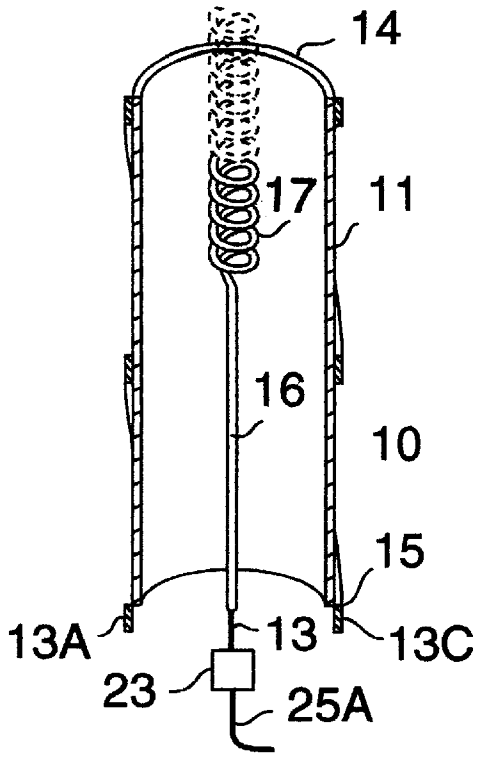
FIG. 4 is a diagrammatic view of a further embodiment of a partly broken up radiating structure, and an arrangement for the excitation or feeding of the radiating structure for operation also with linearly polarized RF waves, according to the invention.

FIG. 4 shows a variation of the embodiment of FIG. 3, with the difference being the construction of the centrally arranged radiator. This radiator comprises a feed line 16, acting as a straight radiator, connected at its second end to a normal mode helical radiator 17. A normal mode helical radiator is a helically wound single wire radiator having a circumference <<λ. The length of the combined radiator 16+17 can be the same as in the previous embodiment, and is preferably longer than the radiating structure 10.

Figure 5:
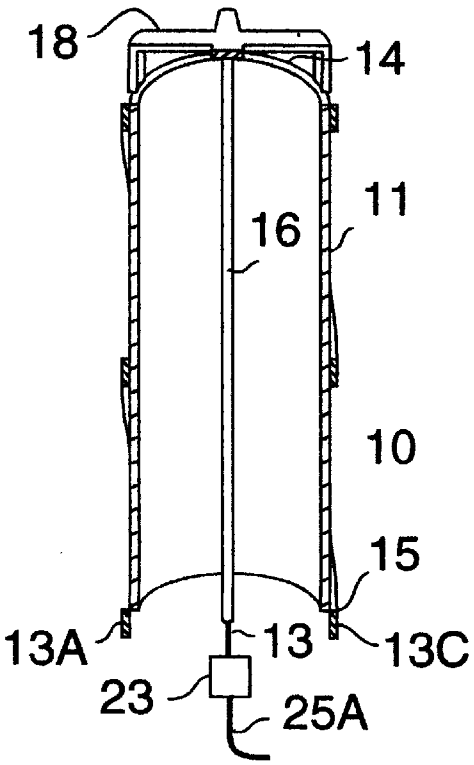
FIG. 5 is a diagrammatic view of a further embodiment of a partly broken up radiating structure, and an arrangement for the excitation or feeding of the radiating structure for operation also with linearly polarized RF waves, according to the invention.
Figure 6:
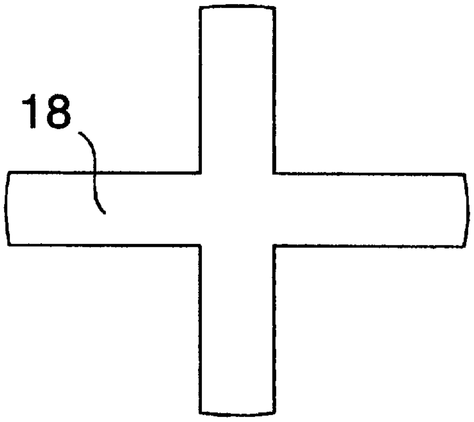
FIG. 6 is a top view of an element for capacitive top loading shown in FIG. 5.

FIG. 5 shows a further variation of the embodiment of FIG. 3, with the difference being the construction of the centrally arranged radiator. This radiator comprises a straight radiator 16 extending beyond the second end 14 of the radiating structure 10, and is provided with a capacitive top loading 18. The straight radiator 16 is provided with a conductive cross-like element 18 with the ends folded down. The element 18 is seen in a top view in FIG. 6. Through this capacitive top loading 18, the current maximum of the centrally arranged radiator is moved towards the second end, with improved antenna performance. The cross structure prevents circulating currents in the capacitive top load element 18.

Figure 7:
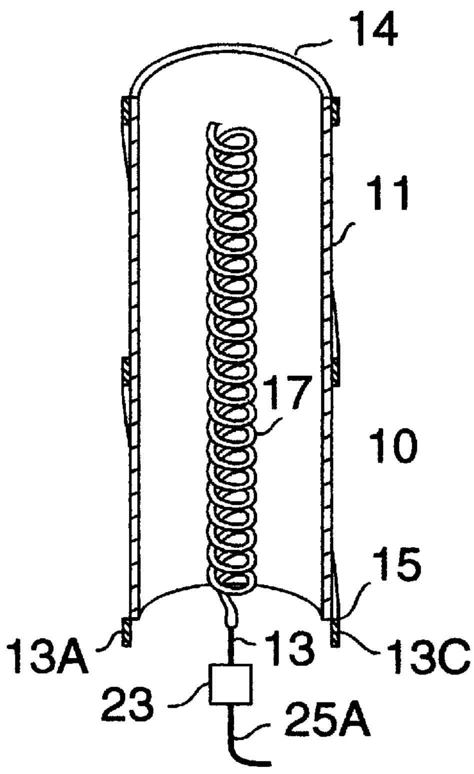
FIG. 7 is a diagrammatic view of a further embodiment of a partly broken up radiating structure, and an arrangement for the excitation or feeding of the radiating structure for operation also with linearly polarized RF waves, according to the invention.

FIG. 7 shows a further variation of the embodiment of FIG. 3, with the difference being the construction of the centrally arranged radiator. This radiator comprises a normal mode helical radiator 17. The length of the radiator 17 can be longer than the radiating structure 10 or the same, but preferably it is shorter.

Figure 8:
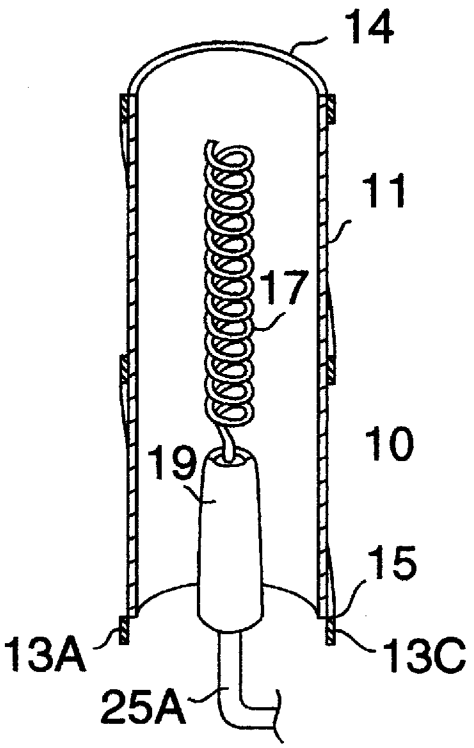
FIG. 8 is a diagrammatic view of a further embodiment of a partly broken up radiating structure, and an arrangement for the excitation or feeding of the radiating structure for operation also with linearly polarized RF waves, according to the invention.

FIG. 8 shows a further variation of the embodiment of FIG. 3, with the difference being the construction of the centrally arranged radiator. This radiator comprises a sleeve antenna, with a sleeve 19 and a radiator denoted 17. The pocket under the folded back sleeve 19 has an electrical length being essentially $\lambda/4$, and prevents currents from flowing on the outside of the feeding cable 25A. The radiator 17 can be straight or helical e.g. a normal mode helical radiator. The electrical length of the radiator 17 is preferably also essentially $\lambda/4$. The sleeve antenna can be shorter then the radiating structure 10 or have the same length. However, it is to prefer that it is longer and will protrude beyond the second end of the radiating structure 10. When using a sleeve antenna, the matching means can possibly be excluded. The sleeve antenna is fed by a coaxial cable 25A with the outer conductor connected to a ground plane means or similar structure.

Figure 9:
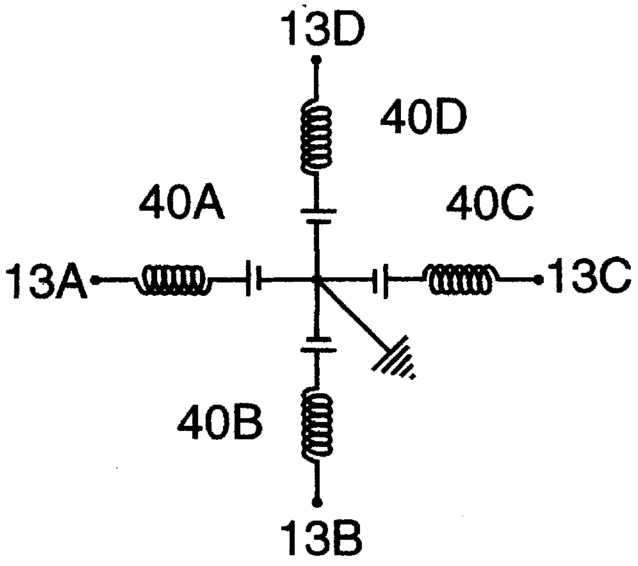
FIG. 9 is a diagrammatic view of a filter for canceling unwanted signals, according to the invention.

Linearly polarized RF waves received by the radiating structure 10 will cause signals being in phase on the feed portions 13A–D. If they are not separated by diplexers as in the embodiment of FIG. 2, they can enter the transceiver circuits for circularly polarized RF waves of the radio communication device through the phasing network 21. In the cases where the received linearly polarized RF waves are coupled to a centrally arranged radiator it is advantageous to cancel or drain off these signals. This can be made by means of filters 40A–D, shown in FIG. 9. Each filter is connected at one end with a respective feed portion 13A–D of the radiating structure 10. The other ends of the filters are connected to each other and to signal ground. These filters have resonance frequency at the frequencies of the linearly polarized RF waves which are well separated from those of the circularly polarized RF waves.

Figure 10:
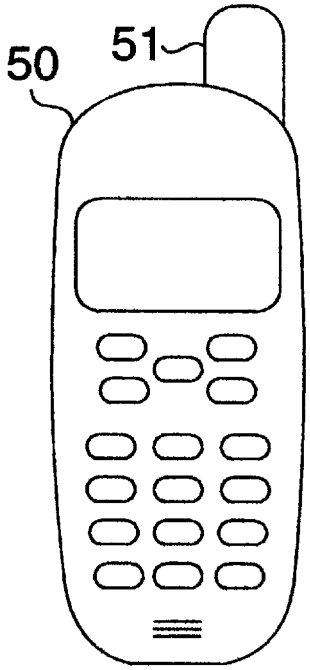
FIG. 10 is a diagrammatic view of a hand portable telephone provided with antenna system according to the invention.

FIG. 10 shows a hand portable telephone provided with antenna system according to the invention. The antenna including the radiating structure 10 and the radiators 16, 17, 18, 19 are preferably protected by an electrically insulating cover 51. The antenna is shown in its retracted position in the figure. It is seen that a part of the antenna protrudes from the telephone housing 50, even if the antenna is in its retracted position. This is advantageous, since the antenna then can operate in the satellite system with paging function and standby mode or even call mode in the terrestrial systems.

The housing of the telephone may be conductive, providing shielding to the PCB(s) of the unit, and connected to signal ground. A ground plane can be formed by the housing 50 of the telephone or a portion thereof, which is connected to the signal ground of transceiver circuits of the telephone. The ground plane could alternatively be a conductive plate, conductive foil or a printed circuit board.

Although the invention is described by means of the above examples, naturally, many variations are possible within the scope of the invention.

What is claimed is:

1. An antenna system including an antenna device and feed device for transmitting and receiving RF waves, comprising:

a radiating structure having a first and a second end, said radiating structure including N helical radiating elements, being coextending and coaxially arranged on a support structure, where N is an integer greater than one, a feed portion for each respective helical radiating element provided at the first end of said radiating structure, a feeding means being connected, at N connections to each one of said feed portions of said helical radiating elements, said feeding means having connection means for connection to circuitry of a radio communication device, said feeding means including a phasing network for phasing the signals on said N connections, in order to provide for transmission/reception of circularly polarized RF waves in a first mode of operation, and means arranged for essentially uniform excitation of the helical radiating elements in order to provide for transmission/reception of linearly polarized RF waves in a second mode of operation.

2. The system according to claim 1, wherein means are arranged for the prevention of signals being of the same phase on the feed portions of the helical radiating elements from entering the circuitry of a radio communication device via the phasing network.

3. The system according to claim 2, wherein the means for the prevention of signals being of the same phase on the feed portions of the helical radiating elements from entering the circuitry of a radio communication device via the phasing network include N filters, each filter being connected at one end to the feed portion of a respective helical radiating element, and the filters being connected to common signal ground at the other end.

4. The system according to claim 1, wherein

N is at least 3.

5. The system according to claim 1, wherein the phasing network provides a phase shift between two consecutive connections of said N connections essentially being 360°/N.

6. The system according to claim 1, wherein

N=4, the phasing network has an input for connection to the circuitry of the telecommunication device and includes a 90° power divider, whereof each of its two outputs being connected to an input of a 180° power divider, respectively, whereby it is obtained four outputs with 90° progressive phase shift, of which each is connected to a respective feed portion of the helical radiating elements, and the 180° power dividers being broad band dividers, for all involved frequencies, canceling signals being of the same phase on the feed portions of the helical radiating elements.

7. The system according to claim 1, wherein the helical radiating elements exhibits free ends at the second end of said radiating structure.

8. The system according to claim 1, wherein a ground plane means or similar structure is arranged to be connected to ground of the circuitry of the radio communication device.

9. The system according to claim 1, wherein a straight radiator is arranged coaxially with and surrounded by said helical radiating elements, the straight radiator has a first and a second end, and the straight radiator is provided, at its first end, with a feed portion, which is to be connected to circuitry, including a ground structure, of the radio communication device, possibly via a matching means, whereby it is achieved a coupling between the straight radiator and the helical radiating elements, for operation in the second mode.

10. The system according to claim 9, wherein the straight radiator has a length being essentially the same as that of said radiating structure, and the straight radiator and said radiating structure are coextending over essentially their entire lengths.

11. The system according to claim 9, wherein the straight radiator has a length being greater than that of said radiating structure, and the straight radiator and said radiating structure are coextending over essentially the entire length of said radiating structure.

12. The system according to claim 11, wherein the straight radiator has a capacitive top loading at the portion not coextending with said radiating structure.

13. The system according to claim 9, wherein the straight radiator has a length being smaller than that of said radiating structure, and the straight radiator and said radiating structure are coextending over essentially the entire length of straight radiator, the straight radiator being connected at its second end with a second normal mode helical radiator.

14. The system according to claim 13, wherein the radiator comprising of the straight radiator and the second normal mode helical radiator has a length being greater than that of said radiating structure.

15. The system according to claim 1, wherein a normal mode helical radiator is arranged coaxially with and surrounded by said helical radiating elements, the normal mode helical radiator has a first and a second end, and the normal mode helical radiator is provided, at its first end, with a feed portion, which is to be connected to circuitry, including a ground structure, of the radio communication device, possibly via a matching means, whereby it is achieved a coupling between the normal mode helical radiator and the helical radiating elements, for operation in the second mode.

16. The system according to claim 1, wherein a sleeve antenna is arranged coaxially with and surrounded by said helical radiating elements, the sleeve antenna has a first and a second end, and the sleeve antenna is fed by a feeding line, which is to be connected to circuitry, including a ground structure, of the radio communication device, possibly via a matching means, whereby it is achieved a coupling between the sleeve antenna and the helical radiating elements, for operation in the second mode.

17. The system according to claim 16, wherein the sleeve antenna includes a third normal mode helical radiator.

18. The system according to claim 1, wherein the means for excitation of the helical radiating elements includes a radiator means arranged substantially coaxially with and surrounded by said helical radiating elements, the radiator means has a first and a second end, the radiator means is provided, at its first end, with a feed portion, which is to be connected to circuitry, including a ground structure, of the radio communication device, possibly via a matching means, the radiator means is provided, at its second end, with a normal mode helical radiator, and the radiator means has a length being essentially the same as that of said radiating structure, and the radiator means and said radiating structure are coextending over essentially their entire lengths.

19. The system according to claim 1, wherein a normal mode helical radiator, having a first and a second end whereof its first end is provided with a feed portion, is arranged with its first end in a region of the second end of the radiating structure, and the first end of the normal mode helical radiator is located between the second end of the normal mode helical radiator and the first end of the radiating structure.

20. The system according to claim 1, wherein one diplexer is connected at its output to each one of the helical radiating elements, a first input of each diplexer is connected to a respective one of the N connections of the feeding means, and a second input of each diplexer is connected to the transceiver circuits for the linear polarization mode of the radio communication device.

21. A hand-held mobile communication device characterized in that it is provided with an antenna system according to claim 1.

* * * * *